UNITED STATES PATENT OFFICE.

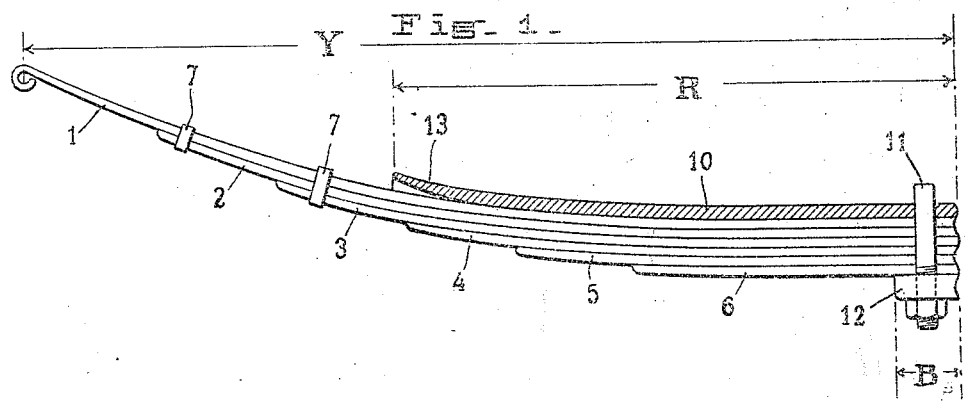
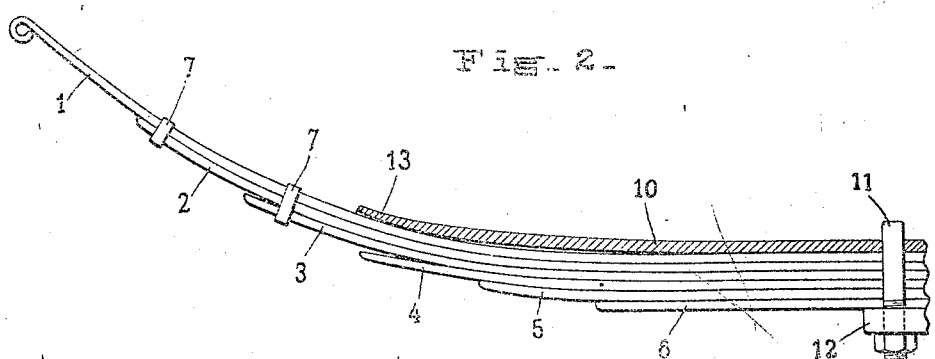
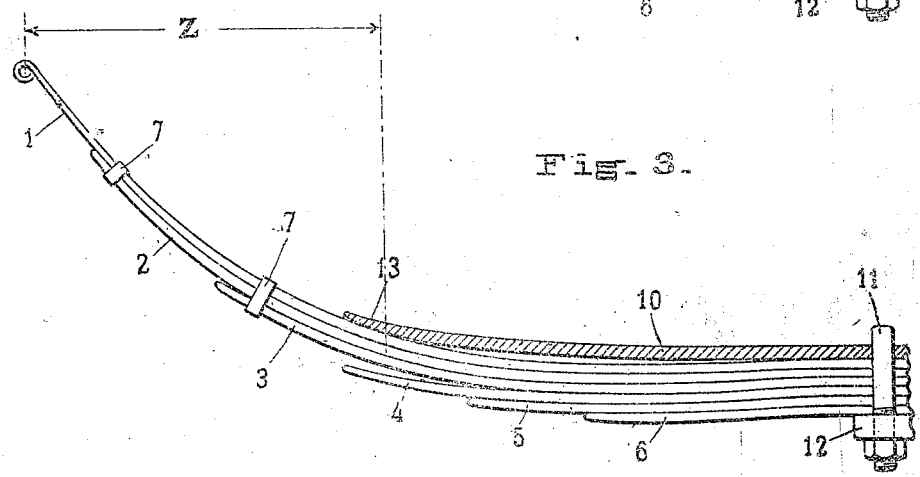

HENRY S. CHAPIN, OF ROCKVILLE CENTER, NEW YORK.

VEHICLE SPRING CONSTRUCTION.

1,094,701.  Specification of Letters Patent.  Patented Apr. 28, 1914.

Application filed July 17, 1913. Serial No. 779.

*To all whom it may concern:*

Be it known that I, HENRY S. CHAPIN, a citizen of the United States of America, and residing at Rockville Center, in the county of Nassau and State of New York, have invented new and useful Improvements in Vehicle Spring Construction, of which the following is a specification.

The invention relates particularly to improvements in the construction set forth in my Patent #1,034,401 dated July 30th, 1912.

The main objects are to give a better control of the action of the spring and afford easier riding qualities.

Another object is to still further decrease the possibility of breaking the spring leaves and to allow the use of lighter springs which are less expensive and more resilient and to reduce incidental wear to a minimum.

Briefly the features of improvement over my former patent above referred to reside principally in the relative size, shape and co-location of the parts. The rigid rebound check plate or bar is curved at its ends away from the spring so that the spring is allowed freedom of oscillation through minimum ranges and is checked increasingly on the recoil or rebound.

Figure 1, illustrates one form of spring embodying the improvements of my invention, the parts being in the normal position of rest. Fig. 2, is a similar view showing the parts under considerable load or compression due to rebound. Fig. 3, is a similar view showing the parts in the position of additional rebound or recoil stress.

On account of the dimensions of the drawings it is necessary to exaggerate certain details somewhat in order that the action may be more easily understood. While I have illustrated only one type of spring in my present application, I wish it understood that I consider the invention as applicable to other types of springs such for instance as illustrated in my former patent.

The spring proper is of the compound leaf type having a plurality of leaves such as 1, 2, 3, 4, 5 and 6 graduated in length and coacting with each other as is common in compound leaf constructions. In the form shown the load is applied to the end of the long leaf. Two or more of the leaves may be secured together, for instance, by clips such as 7 forming a lever member, as distinct from the remaining shorter leaves, not clipped to the long leaves, which form a cushion member. The rigid plate or check bar 10 is secured against the concave side of the spring proper for instance, by means of clips such as 11 passing around the bearing 12.

As in my former patent it will be noted that the length R of the rigid plate or check bar is materially greater than the length B of the bearing block 12. In the form shown the rigid plate or check bar is substantially one-half the length Y of the free portion of the spring proper. The central part of the rigid plate or check bar is shaped to correspond with and normally be in contact with the central part of the long leaf member 1, while the ends 13 being of smaller radius than the spring leaf 1 curve away from the spring leaf. It will be noted that the effective lever arm of each end of the spring under compression is indicated by the length Y, while the effective length under rebound is variable. In the position shown in Fig. 3 this is equal to Z. It will be noted that in the rebound the point of contact of the long leaf 1 gradually advances as the leaf flexes along the rigid plate or check bar until the fulcrum causes the inner part of the long leaf to lift away from the check bar as shown in Fig. 3 at which time the shorter or cushion leaves again afford compression resistance in a manner similar to their resistance under normal load compression. During normal load compression the point of contact between the check bar and the long leaf varies with the slight inequalities of the road and consequent variations of compression, the constant change in the free length of the long leaves preventing the formation of harmonics of vibration at any one spot constantly, which vibrations cause crystallization of the steel in springs not fitted with this check or damper, weakening the spring until it breaks. The variation in the point of fulcrum has a similar effect in distributing and dampening the vibrations that might take place both sides of the fulcrum during its effective action, with similar benefit in preventing crystallization of the metal and consequent weakness.

In addition to controlling the degree of action by the length of the rigid plate or check bar by the number of long leaves clipped together and by the number of short leaves remaining as a cushion or cushions, the designer may shape the end of the rigid plate or check bar on the face adjacent the spring proper so that it curves away from the long leaf. The curve may be varied in shape as desired and the bar lengthened if desired for this purpose. In such a construction the effective length of the rocker and the point of fulcrum in minor reactions of the spring begins at the inner end of the curve of the check bar, but in greater reactions the point of fulcrum moves outward along this curved end and affords a continued rocker motion or traveling fulcrum. It produces not only a rocking check to the point of fulcrum, but a rocking fulcrum which makes the leverage progressive and therefore a further feature of control.

Although the construction of my former patent has been found to have practically no wear, this improved construction distributes the stresses and the very slight wear.

What I claim is:—

1. In a vehicle spring construction, a plurality of resilient leaf members graded in length, a bearing acting against the shortest leaf member and a rigid check bar secured against the outer face of the longest leaf member but curved at its end away from said leaf member and of substantially greater length than the effective length of said bearing to thereby provide a variable fulcrum for said long leaf member.

2. In a vehicle spring construction, the combination with a plurality of curved resilient leaf members and a bearing on the outer convex side thereof, of a rigid reinforcing and checking bar on the inner concave side of the resilient leaf member of materially greater length than said bearing and having one end curved away from and normally out of contact with the inner leaf member to provide on the rebound action of the spring a progressive fulcrum for the inner leaf member whereby to vary the leverage exerted by the inner leaf member upon the outer leaf member.

3. In a vehicle spring construction, the combination with a plurality of resilient leaf members graded in length and a bearing acting against the shorter leaf member, of a rigid check bar secured against the longest leaf member, and of substantially greater length than the effective length of said bearing, the end of said check bar being disposed away from and normally out of contact with the long leaf member, whereby without diminishing the compression action of the resilient leaf members, said rigid check bar serves to check the rebound of the leaf members and provide a variable fulcrum for the long leaf member so that the effective length of said resilient leaf members under reaction is variable and substantially less than the effective length of the resilient leaf members under compression and the short leaf members serve as a compression resistance to the reaction of the longest leaf member.

HENRY S. CHAPIN.

Witnesses:
ROBT. S. ALLYN,
PHILIP S. McLEAN.